United States Patent [19]

Zenker

[11] 4,116,090

[45] Sep. 26, 1978

[54] CHANGE GEAR TRANSMISSION IN GROUP ARRANGEMENT, ESPECIALLY FOR MOTOR VEHICLES FOR USE IN AGRICULTURE AND IN THE CONSTRUCTION FIELD

[75] Inventor: Walter Zenker, Bensberg-Refrath, Fed. Rep. of Germany

[73] Assignee: Klöckner-Humboldt-Deutz Aktiengesellschaft, Cologne, Fed. Rep. of Germany

[21] Appl. No.: 774,536

[22] Filed: Mar. 4, 1977

Related U.S. Application Data

[63] Continuation of Ser. No. 554,432, Mar. 3, 1975, abandoned.

[30] Foreign Application Priority Data

Mar. 2, 1974 [DE] Fed. Rep. of Germany ....... 2410163

[51] Int. Cl.² ............................................. F16H 3/02
[52] U.S. Cl. .................................. 74/745; 74/665 G

[58] Field of Search ................. 74/360, 331, 745, 625, 74/665 R, 665 K, 665 G

[56] References Cited

U.S. PATENT DOCUMENTS

| | | | |
|---|---|---|---|
| 3,744,345 | 7/1973 | Keienburg et al. | 74/745 |
| 3,916,711 | 11/1975 | Hoyer | 74/745 X |

FOREIGN PATENT DOCUMENTS 1,225,969 9/1966 Fed. Rep. of Germany ............. 74/745

*Primary Examiner*—Samuel Scott
*Assistant Examiner*—Frank H. McKenzie, Jr.
*Attorney, Agent, or Firm*—Walter Becker

[57] ABSTRACT

A transmission constructed in groups with shiftable clutches to vary the ratio and the direction of the drive and including clutches shiftable under load. The arrangement of the clutches shiftable under load is such that a selective shifting under load from forward to rearward drive or from slow forward drive to fast forward drive, and vice versa, will be possible after preselecting a forward or a reversing transmission.

17 Claims, 1 Drawing Figure

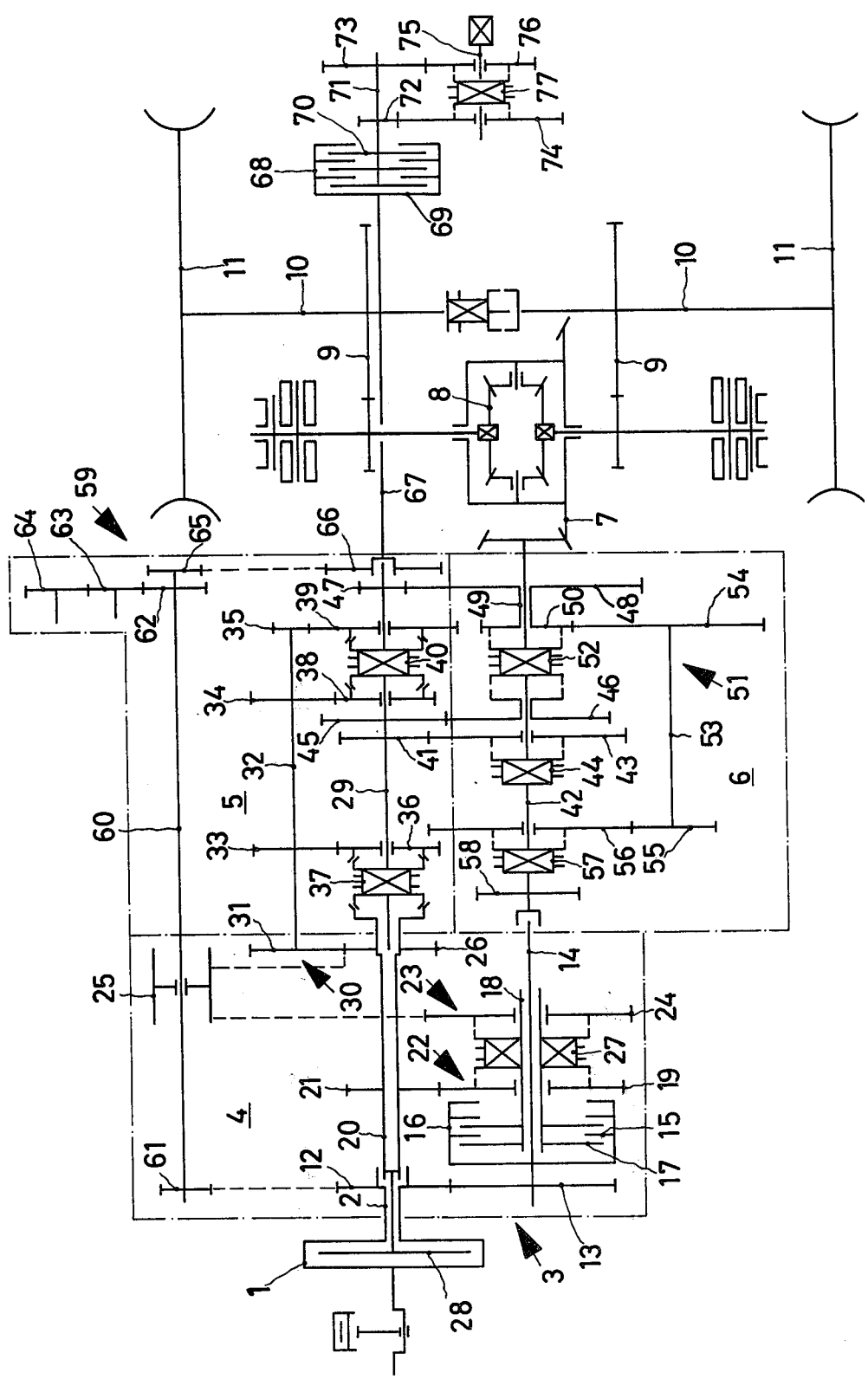

CHANGE GEAR TRANSMISSION IN GROUP ARRANGEMENT, ESPECIALLY FOR MOTOR VEHICLES FOR USE IN AGRICULTURE AND IN THE CONSTRUCTION FIELD

This is a continuation application of Ser. No. 554,432, now abandoned filed Mar. 3, 1975 (Monday) being based on German patent application Ser. No. P 24 10 163.1, filed Mar. 2, 1974 as claimed for priority under 35 USC 119.

The present invention relates to a change gear transmission in group arrangement, especially for motor vehicles for use in agriculture and in the construction field, which are equipped with a group transmission preceding a main control group and provided with an underload shiftable control stage or with control stages for the rearward drive and with two of said control stages for the forward drive while two friction control clutches are provided for controlling said control stage or stages.

When soil working or carrying out harvesting operations by means of motor vehicles for agriculture which are provided with a change gear transmission of the above mentioned type, there exists the problem of obtaining a maximum surface working with a driving engine at a load equalized in an optimum manner. This problem presents itself particularly when working along stretched undulated areas and when working soil, the density of which, greatly varies. In addition thereto, with agricultural work and when working in the construction field, especially when loading operations with a loading device arranged at the front end and/or rear of the vehicle, or with built-on loading devices, there exists the problem to obtain short loading periods by a fast moving onto the material to be loaded and after reversal of the driving direction by a fast transporting away the respective material at a high forward speed. In an endeavor to solve the above mentioned problems, a change gear transmission of the above mentioned general type has become known in which the group transmission which is provided with only one input shaft is adapted to be driven through the intervention of a driving clutch. In this connection, a first friction clutch is adapted selectively to connect the input shaft directly with the output shaft of the group transmission, and a second friction clutch is arranged likewise coaxially with regard to the output shaft. The second friction control clutch of the group transmission is adapted to be driven through the intervention of an engageable and disengageable driving clutch through a selectively engageable forward gear transmission and a reversing gear transmission. This heretofore known change gear transmission has the drawback that for purposes of shifting the two forward driving stages and the single rearward driving stage of the group transmission, in addition to the two friction clutches there is also necessary a driving clutch. The said heretofore known change gear transmission has the additional drawback that due to the rotating masses of the great number of friction clutches, the shifting of the main control transmission following the group transmission is somewhat impeded. As a result thereof, especially when employing synchronizing means for the control elements of the main control transmission, large dimensioned synchronizing elements are required which, of course, greatly enhance the costs of the vehicle.

Based on this finding, it is an object of the present invention to improve a change gear transmission of the above mentioned general type while avoiding the above outlined drawbacks so that when using the driving clutch as second friction control clutch of the group transmission, a selective shifting under load from forward to rearward drive or from slow forward drive to fast forward drive, and vice versa, will be possible after preselecting a forward or reversing transmission.

These and other objects and advantages of the invention will appear more clearly from the following specification, in connection with the accompanying drawing, diagrammatically illustrating an embodiment of the present invention.

The change gear transmission according to the present invention is characterized primarily in that one of the friction clutches is designed as the output shaft of the group transmission and as a driving clutch directly connected to a driving source, and is further characterized in that the other friction clutch is arranged on a countershaft adapted to be driven through the intervention of an input transmission while bypassing the power flow of the driving clutch through which countershaft through the intervention of the second friction control clutch through one engageable and disengageable forward and reversing transmission the output shaft of the group transmission is operable selectively in a forward or rearward driving direction.

By means of such change gear transmission it will be possible that with relatively small rotating masses and merely with two friction clutches, depending on the engagement of the forward or reversing transmission it is possible to shift under load to a forward driving stage or to a reversing stage.

According to a further development of the invention it is provided that the input transmission of the group transmission is permanently frictionally connected to a driving element of the driving source which is directly or indirectly comprising the driving clutch. The overall construction of the group transmission is furthermore favorably affected by the fact that the friction clutch arranged on the gear transmission of the group transmission is designed as pressure fluid operable disc clutch, the secondary part of which, is connected to a hollow shaft member which is mounted on the transmission shaft, said hollow shaft member serving for the freely rotatable mounting of a gear of the forward transmission and for the freely rotatable mounting of an adjacent gear of the reversing transmission for driving the starting shaft of the group transmission. The overall construction of the group transmission is furthermore favorably aided by the fact that the last mentioned two gears are adapted by means of a control element arranged between the two gears selectively to be coupled to the hollow shaft member. A particularly simple and economic construction of the change gear transmission is according to a further development of the invention obtained by the reversing gear transmission comprising a gear which is non-rotatably mounted on the output shaft of the group transmission while said last mentioned gear simultaneously forms the input transmission for the main gear transmission following said input transmission.

If the change gear transmission is provided with an engageable and disengageable friction clutch with an auxiliary drive adapted to be driven parallelly to the power flow of the group transmission by the driving source, it is suggested according to the invention that for the auxiliary drive comprises an auxiliary shaft adapted to be driven by the input shaft of the group transmission, said auxiliary shaft serving the direct or indirect drive of the friction clutch of the auxiliary drive. In this way, a particularly simple solution and construction is obtained by the fact that the auxiliary shaft of the auxiliary drive is arranged parallelly with regard to the output shaft of the group transmission and comprises a non-rotatable gear which meshes with a non-rotatable gear of the input shaft of the group transmission. If the change gear transmission is designed with an output shaft of the main transmission which output shaft is arranged coaxially with regard to the output shaft of the group transmission, it is for purposes of simplifying the mounting of the auxiliary drive suggested that the auxiliary drive comprises an intermediate shaft which is arranged coaxially with regard to the output shaft of the main gear transmission and is driven by the auxiliary shaft, said intermediate shaft being non-rotatably connected to the primary part of the friction clutch of the auxiliary drive.

For purposes of economically designing the reversing stage in the group transmission while simultaneously taking advantage of an auxiliary shaft of the auxiliary drive as mounting, there is according to the invention provided that the reversing gear of the reversing transmission of the group transmission is journaled on the auxiliary shaft of the auxiliary drive.

Referring now to the drawing in detail, the reference numeral 1 designates a flywheel of a non-illustrated driving source designed as internal combustion engine. This flywheel is continuously frictionally connected to the input shaft 2 of a transmission 3 of the group transmission 4 pertaining to the change gear transmission according to the present invention. In addition to said group transmission 4, the change gear transmission according to the present invention comprises a main control transmission 5 following said transmission 4, and a control group 6 driven by the transmission 5, while a bevel gear transmission 7 is adapted to be driven by the control group 6. The bevel gear transmission 7 is followed by a differential 8 by which through a transmission 9 each, a driving axle shaft 10 each with a driving wheel 11 associated therewith is adapted to be driven. The transmission 3 of the group transmission 4, in addition to comprising a gear 12 nonrotatably connected to the input shaft 2 also comprises a gear 13 meshing with gear 12. The gear 13 is non-rotatably mounted on a countershaft 14 which is rotatably journalled on a fixed plate. Nonrotatably mounted on the countershaft 14 is a primary member 15 of a friction clutch 16 which is preferably designed as a fluid operable disc clutch. The clutch 16 comprises a secondary member 17 which is non-rotatably mounted on a hollow shaft 18 which is freely rotatably arranged on the countershaft 14. Freely rotatably mounted on the hollow shaft 18 adjacent the friction clutch 16 and selectively adapted to be coupled thereto is a gear 19 which meshes with a gear 21 which is non-rotatably mounted on an output shaft 20 of the group transmission 4. The gear 19 forms together with the gear 21 the selectively engageable forward drive transmission 22 of the group transmission 4. Furthermore, the group transmission 4 comprises a reversing gear transmission 23. The transmission 23 comprises a gear 24 which is freely rotatable on the hollow shaft 18 which is selectively adapted to be engaged and disengaged. The reversing gear transmission 23 furthermore comprises a reversing gear 25 which meshes with the gear 24. Reversing gear 25 meshes with a gear 26 which is non-rotatably mounted on the output shaft 20. A double control sleeve 27 which is arranged between the two gears 19 and 24 and is axially displaceable on but non-rotatably connected to the hollow shaft 18 serves for selectively pre-selecting a power transmission through the forward or reversing transmission 22 and 23 in a slow forward control stage N or rearward control stage R. The sleeve 27 may if desired be equipped with synchronizing means. Furthermore, the output shaft 20 is adapted directly to be driven in a direct control stage H of the group transmission through a driving clutch 28 connected to the flywheel 1. For shifting the group transmission 4, a control and shifting mechanism may be selected as it is disclosed in the group transmission described in German Offenlegungsschrift No. 1,951,428.

The main control transmission 5 comprises an output shaft 29 which is coaxial with the output shaft 20 of the group transmission 4 and is journalled in the transmission housing (not illustrated). The selective drive of output shaft 29 is effected by an input transmission 30 through a gear 31 meshing therewith, gear 26 forming a part of said transmission 30. Gear 31 is non-rotatably mounted on a countershaft 32. The gear 31 is preferably designed with the same or a greater pitch circle diameter than the gear 26. Furthermore, non-rotatably mounted on the countershaft 32 are gears 33, 34 and 35. Gear 33 meshes with a gear 36 which is freely rotatable and selectively engageable on the output shaft 29 and with the latter forms the velocity stage III of the main control transmission 5. For purposes of shifting the velocity stage III and for coupling the output shaft 20 to the output shaft 29 in order to engage the velocity stage IV of the main control transmission 5, a double control sleeve 37 equipped with synchronizing elements is arranged between the gears 26 and 36 and is axially displaceable on but nonrotatably connected to the output shaft 29. The velocity stage II of the main control transmission 5 is formed in addition to the gear 34 by a gear 38 which meshes with gear 34 and is freely rotatable and selectively engageable on the output shaft 29. The velocity stage I of the main control transmission 5 is formed by the gear 35 and a gear 39 meshing with gear 35. Gear 39 is likewise freely rotatable and selectively engageable on output shaft 29. For purposes of engaging the velocity stages I and II, a double control sleeve 40 equipped with synchronizing members is provided between the gears 38 and 39. Sleeve 37 should be operatively connected through a non-illustrated control rod, similar to the double control sleeve 40, with a common control lever of the main control transmission 5.

In addition to the above mentioned power transmitting elements of the output shaft 29, between the gears 36 and 38 there is provided in a non-rotatable arrangement a gear 41 which has a shorter pitch circle diameter than the gear 36. Gear 41 meshes with a freely rotatable and selectively engageable gear 43 which is arranged on an output shaft 42 of group 6. Gear 41 together with the gear 43 forms a control stage Z serving for main soil-working operations. The engagement of the control stage Z is effected by means of a nonrotatable control sleeve 44 which is axially displaceable on the output shaft 42. For forming a control stage S of group 6 for fast street operation, there is provided a gear 45 which has a greater pitch circle diameter than the gear 41. Gear 45 is located between the gear 41 and the gear 38 and is non-rotatably connected to the output shaft 29.

Gear 45 meshes with a gear 46 which is freely rotatable on output shaft 42 and is selectively engageable. Furthermore, the right hand end (with regard to the drawing) of the output shaft 29 is provided with a non-rotatable smaller gear 47 which has a shorter pitch circle diameter than its other gears. Gear 47 meshes with a gear 48 which is freely rotatable on the output shaft 42. Gear 48 forms together with gear 47 a control stage L of group 6 for a slow soil-working operation. Gear 48 is through a hollow shaft section 49 non-rotatably connected to an adjacent gear 50 of a crawl transmission 51. The engagement of the control stage S and L is effected through a double control sleeve 52 which is arranged between the gears 46 and 50 and is non-rotatably but axially displaceably arranged on the output shaft 42. The crawl transmission 51 comprises a gear 54 which meshes with the gear 50 and is non-rotatably connected to an auxiliary shaft 53. Gear 54 is adapted through a further gear 55 non-rotatably connected to auxiliary shaft 53 to drive a gear 56 in a crawl stage K. Gear 56 is freely rotatable on the output shaft 42 and is selectively engageable. The engagement of the crawl speed stage K of group 6 is effected by means of a control sleeve 57 which is non-rotatably but axially displaceably connected to the output shaft 42.

The output shaft 42 of group 6 should preferably be arranged coaxially with regard to the countershaft 14 of the group transmission 4. Furthermore, the output shaft 42 should between its bearing facing the gear 24 and the control sleeve 57 be provided with a non-rotatable gear 58 for a stroke depending auxiliary drive as for instance a front axle drive.

In addition thereto, the change gear transmission comprises an auxiliary drive 59 responsive to the engine speed. This drive 59 comprises a gear 61 which is non-rotatable on a countershaft 60 and which meshes with the gear 12. On the auxiliary shaft 60 is preferably journalled the reversing gear 25 of the reversing transmission 23 pertaining to the group transmission 4. The auxiliary drive 59 furthermore comprises a gear 62 which is non-rotatably connected to the auxiliary shaft 60. Gear 62 meshes with the gear 63 and directly or indirectly meshes with a further gear 64. The gears 63, 64 are intended to drive an auxiliary pump or a compressor. Furthermore, the auxiliary drive 59 comprises a gear 65 which is nonrotatably connected to the auxiliary shaft 60 and which meshes with a gear 66. Gear 66 is non-rotatably arranged on an auxiliary shaft 67 which is coaxial with the output shaft 29. The auxiliary shaft 67 has that end thereof which faces away from the output shaft 29 non-rotatably connected to the primary member 68 of a friction clutch 69 designed as a pressure fluid operable disc clutch. The secondary member 70 of clutch 69 is non-rotatably connected to an auxiliary shaft 71 which latter has gears 72 and 73 non-rotatably connected thereto. Gear 72 meshes with an associated gear 74 for the output speed N = 540 of the auxiliary drive. Gear 74 is freely rotatable and selectively engageable on a pivot shaft 75. For driving shaft 75 at a speed of N = 1000 there is provided a gear 76 which is freely rotatable and selectively engageable on said shaft 75 and meshes with the gear 73. For purposes of preselecting the two possible output speeds of the auxiliary shaft 75 which is adapted to be coupled to a non-illustrated shaft stump, there is provided a double sleeve 77 which is non-rotatably but axially displaceably connected to the shaft 75.

It is, of course, to be understood that the present invention is, by no means, limited to the specific showing in the drawing but also comprises any modifications within the scope of the appended claims.

What is claimed is:

1. A transmission in group arrangement with relatively small rotating masses and merely with friction clutch means suitable for frequent shifting under load, especially for motor driven agricultural and construction vehicles, comprising in combination: a main control group, a group transmission which precedes said main control group and having one control stage shiftable under load for rearward drive and having two control stages shiftable under load for forward drive adapted selectively to shift under load from forward drive to reverse drive by way of the same transmission as well as having a first input shaft adapted for continuous frictional connection to a source of driving power and a first output shaft, a main control transmission following said group transmission and having a first auxiliary shaft driven by the output shaft of said group transmission and a second output shaft, said control group having a third output shaft adapted for connection to a load, first gears fixed to said first auxiliary shaft, second gears rotatable on said second output shaft meshing with said first gears, first clutch means for selectively coupling said second gears to said second output shaft, third gears fixed to said second output shaft and fourth gears driven by said third gears and rotatable on said third output shaft, second clutch means for selectively coupling said fourth gears to said second output shaft, a friction clutch means coaxially between said first input shaft and said first output shaft, a countershaft driven by said first input shaft, a hollow shaft coaxially rotatable on said countershaft, forward and reverse drive gear trains each including a gear fixed to said first output shaft and a gear rotatable on said hollow shaft, third clutch means for selectively coupling said hollow shaft to the said gears thereon, and interengageable clutch elements on said countershaft and hollow shaft.

2. A geared transmission in combination according to claim 1 in which said first input shaft includes a flywheel continuously frictionally connected thereto, said friction clutch means being interposed between said flywheel and said first output shaft.

3. A geared transmission in combination according to claim 1 in which said interengageable clutch elements comprise primary and secondary parts of a fluid actuated friction clutch means, the primary part of the clutch means being nonrotatable on said countershaft, the secondary part of the clutch means being nonrotatable on said hollow shaft, one of said gear trains including a reversing idler gear.

4. A geared transmission in combination according to claim 1 in which a single reversing gear of said reverse gear train which is nonrotatable on said first output shaft also forms the gear driving said first auxiliary shaft.

5. A geared transmission in combination according to claim 1 which includes an auxiliary transmission comprising a second auxiliary shaft driven by said first input shaft, an output element, and an auxiliary friction clutch means having one side drivingly connected to said output element and the other side drivingly connection to said second auxiliary shaft.

6. A geared transmission in combination according to claim 5 in which said second auxiliary shaft is parallel to said first output shaft, a single gear nonrotatable on the second auxiliary shaft and a further gear meshing therewith and nonrotatable on said first input shaft.

7. A geared transmission in combination according to claim 6 in which said first and second output shafts are coaxially arranged, said auxiliary transmission including a further shaft coaxial with said first and second output shafts geared to said second auxiliary shaft and connected to said other side of said auxiliary friction clutch means.

8. A geared transmission in combination according to claim 6 in which said reversing gear train includes a single gear rotatable on said second auxiliary shaft.

9. In a gear change transmission in group arrangement, including an input transmission and a drive machine as well as a forward transmission with an output shaft, especially for motor vehicles for use in agriculture and in the construction field with a group drive having a main control group connected preliminarily thereto as well as having a first power flow path with an input transmission and a second power flow path with an input shaft and including a control group shiftable under load serving for rearward drive and with two control stages shiftable under load serving for forward drive while two frictional control clutches are provided for the shifting thereof, whereby the first of both control groups serves between a first side shaft connected with the secondary part thereof and the output shaft of the group drive by means of positive shift control means selectively shiftable as to forward gearing and reverse gearing in a first power flow path of the group drive and whereby the second of both control groups is embodied as a travel coupling connected directly with the drive machine and the drive of one input shaft of a second power flow path of the group drive serves in a fixed transmission ratio, the improvement therewith which comprises that the first of both frictionally engaged shiftable control clutches is arranged upon the counter shaft of the input transmission of the first power flow path of the group drive remaining positively engaged as coupled with the drive machine and that the output shaft of the forward transmission driven selectively by way of the first control clutch is arranged coaxial to the input shaft of the second power flow path of the group drive connected with the second control clutch that the first frictionally engaged control clutch is embodied as a pressure medium actuated friction coupling and that the output shaft of the forward transmission selectively driven by way of the first frictionally engaged control clutch forms therewith the output shaft of the group drive and the input shaft of the second power flow path thereof.

10. In a gear change transmission according to claim 9, wherein the auxiliary drive shaft serving the selective driving of the forward transmission and reversing transmission of the first power flow path of the group transmission is embodied as a hollow shaft and upon the counter shaft of the input transmission this hollow shaft is journalled for driving the first frictionally engaged control clutch whereby the hollow shaft is connected with a secondary part of said friction coupling.

11. In a gear change transmission according to claim 9, wherein the input transmission of the first power flow path of the group transmission is connected to remain in positive engagement with the driving machine and a gear is provided therewith, which meshes with a drive gear seated upon an auxiliary drive shaft and that the auxiliary drive shaft is effectively connected with a tap shaft by way of an engageable and disengageable friction coupling.

12. In a gear change transmission according to claim 11, wherein the drive gear arranged upon the auxiliary drive shaft meshes with the drive gear of the input shaft of the input transmission of the first power flow path of the group transmission.

13. In a gear change transmission according to claim 12, wherein a reversing gear of the reversing transmission of the first power flow path of the group transmission is journalled on the auxiliary shaft.

14. In a gear change transmission according to claim 13, wherein the reversing transmission comprises a gear nonrotatably connected to the output shaft of the group transmission, said gear simultaneously forming an input transmission of the main transmission following said input transmission.

15. In a gear change transmission in group arrangement including an input transmission and a drive machine as well as a forward transmission with an output shaft, especially for motor vehicles for use in agriculture and in the construction field with a group drive having a main control group connected preliminarily thereto as well as having a first power flow path with an input transmission and a second power flow path with an input shaft and including a control group shiftable under load serving for rearward drive and with two control stages shiftable under load serving for forward drive while two frictional control clutches are provided for the shifting thereof, whereby the first of both control groups serves between a first side shaft connected with the secondary part thereof and the output shaft of the group drive by means of positive shift control means selectively shiftable as to forward gearing and reverse gearing in a first power flow path of the goup drive and whereby the second of both control groups is embodied as a travel coupling connected directly with the drive machine and the drive of one input shaft of a second power flow path of the group drive serves in a fixed transmission ratio, the improvement therewith which comprises that the first of both frictionally engaged shiftable control clutches is arranged upon the counter shaft of the input transmission of the first power flow path of the group drive remaining positively engaged as coupled with the drive machine and that the output shaft of the forward transmission driven selectively by way of the first control clutch is arranged coaxial to the input shaft of the second power flow path of the group drive connected with the second control clutch and that the input transmission of the first power flow path of the group drive connected to remain positively in engagement with the drive machine has a gear which meshes with a drive gear, and an auxiliary drive shaft effectively connected with a tap shaft by way of an engageable and disengageable friction coupling.

16. In a gear change transmission in group arrangement including an input transmission and a drive machine as well as a forward transmission with an output shaft, especially for motor vehicles for use in agriculture and in the construction field with a group drive having a main control group connected preliminarily thereto as well as having a first power flow path with an input transmission and a second power flow path with an inner shaft and including a control group shiftable under load serving for rearward drive and with two control stages shiftable under load serving for forward drive while two frictional control clutches are provided for the shifting thereto, whereby the first of both control groups serves between a first side shaft connected with the secondary part thereof and the output shaft of the group drive by means of positive shift control means selectively shiftable as to forward gearing and reverse gearing in a first power flow path of the group drive and whereby the second of both control groups is embodied as a travel coupling connected directely with the drive machine and the drive of one input shaft of a second power flow path of the group drive serves in a fixed transmission ratio, the improvement therewith which comprises that the first of both frictionally engaged shiftable control clutches is arranged upon the counter shaft of the input transmission of the first power flow path of the group drive remaining positively engaged as coupled with the drive machine and that the output shaft of the forward transmission drive selectively by way of the first control clutch is arranged coaxial to the input shaft of the second power flow path of the group drive connected with the second control clutch and that the input transmission of the first power flow path of the group drive connected to remain positively in engagement with the drive machine has a gear which meshes with a drive gear, an auxiliary drive shaft effectively connected with a tap shaft by way of an engageable and disengageable friction coupling, and a gear of a reversing transmission of the first power flow path of the group drive journalled upon an auxiliary drive shaft therewith.

17. In a gear change transmission according to claim 16, wherein an output shaft of the main control transmission is arranged coaxially with regard to the output shaft of the group transmission and an auxiliary drive therewith includes an intermediate shaft which is arranged coaxially with regard to the output shaft of the main control transmission and is driven by the auxiliary shaft, said intermediate shaft being nonrotatably connected to the primary part of the friction clutch pertaining to the auxiliary drive.

* * * * *